US012754793B2

(12) United States Patent
Azeez et al.

(10) Patent No.: US 12,754,793 B2
(45) Date of Patent: Oct. 6, 2026

(54) MULTI-CONTEXTUAL ANOMALY DETECTION

(71) Applicant: THE BANK OF NEW YORK MELLON, New York, NY (US)

(72) Inventors: Innamul Hassan Abdul Azeez, Chennai (IN); Badri V. Mangalam, South Barrington, IL (US); Sridhar M. Seetharaman, Princeton, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 1102 days.

(21) Appl. No.: 17/878,272

(22) Filed: Aug. 1, 2022

(65) Prior Publication Data

US 2024/0036963 A1 Feb. 1, 2024

(51) Int. Cl.
*G06F 11/07* (2006.01)
*G06N 20/00* (2019.01)

(52) U.S. Cl.
CPC ........ *G06F 11/079* (2013.01); *G06F 11/0709* (2013.01); *G06N 20/00* (2019.01)

(58) Field of Classification Search
CPC .... G06F 11/079; G06F 11/0709; G06N 20/00
See application file for complete search history.

(56) References Cited

U.S. PATENT DOCUMENTS

| | | | | |
|---|---|---|---|---|
| 10,102,056 | B1 * | 10/2018 | Goldberg | G06F 9/45558 |
| 10,884,805 | B2 * | 1/2021 | Huang | G06F 11/3006 |
| 11,120,343 | B2 * | 9/2021 | Das Gupta | G06N 5/025 |
| 11,449,712 | B2 * | 9/2022 | Pai | G06F 18/217 |
| 11,636,125 | B1 * | 4/2023 | Carmona Perez | G06N 3/08 707/736 |
| 11,748,568 | B1 * | 9/2023 | Orhan | H04L 41/16 709/224 |
| 11,928,017 | B2 * | 3/2024 | Ye | G06N 3/0455 |
| 12,265,446 | B1 * | 4/2025 | Callot | G06F 11/0793 |
| 12,487,879 | B2 * | 12/2025 | Tang | G06N 3/0442 |
| 2019/0050515 | A1 * | 2/2019 | Su | G06N 3/0455 |
| 2020/0065212 | A1 * | 2/2020 | Chanda | G06F 11/3452 |
| 2020/0174902 | A1 * | 6/2020 | Buda | G06F 11/079 |
| 2020/0175518 | A1 * | 6/2020 | Chu | G06Q 20/4016 |
| 2020/0311603 | A1 * | 10/2020 | Qiu | G06F 11/3452 |
| 2020/0322367 | A1 * | 10/2020 | Salvat Lozano | H04L 41/5009 |

(Continued)

*Primary Examiner* — David E Choi

(74) *Attorney, Agent, or Firm* — Pillsbury Winthrop Shaw Pittman, LLP

(57) ABSTRACT

The disclosure relates to systems and methods of detecting anomalies using a plurality of machine learning models. Each of the machine learning models may be trained to detect a respective behavior of historical data values for a given metric. Thus, a system may perform anomaly detection based on different behaviors of the same metric of data, reducing instances of false positive anomaly detection while also reducing instances of false negative reporting. The plurality of machine learning models may be trained to detect anomalies across multiple different types of metrics as well, providing robust multi-metric anomaly detection across a range of behaviors of historical data values. The system may implement a pluggable architecture for the plurality of machine learning models in which models may be added or removed from pluggable architecture. In this way, the system may detect anomalies using a configurable set of machine learning models.

20 Claims, 10 Drawing Sheets

(56) References Cited

U.S. PATENT DOCUMENTS

| | | | | |
|---|---|---|---|---|
| 2020/0396147 | A1* | 12/2020 | Han | H04W 24/04 |
| 2021/0004704 | A1* | 1/2021 | Dang | H04L 67/10 |
| 2021/0344695 | A1* | 11/2021 | Palani | G06F 16/285 |
| 2022/0124110 | A1* | 4/2022 | Chhabra | H04L 63/1425 |
| 2022/0182280 | A1* | 6/2022 | Ben Hamida | H04L 41/0654 |
| 2022/0237102 | A1* | 7/2022 | Bugdayci | G06F 11/327 |
| 2022/0398182 | A1* | 12/2022 | Liu | G06F 11/3419 |
| 2022/0413956 | A1* | 12/2022 | Mathew | G06F 9/5016 |
| 2023/0126260 | A1* | 4/2023 | Elsakhawy | H04L 41/16 709/224 |
| 2023/0132670 | A1* | 5/2023 | Kalamkar | G06N 20/00 706/14 |
| 2023/0229550 | A1* | 7/2023 | Zhao | H04L 41/0627 714/33 |
| 2023/0229733 | A1* | 7/2023 | Dar | G06F 11/3409 706/45 |
| 2023/0237044 | A1* | 7/2023 | Parthasarathy | G06N 20/00 707/690 |
| 2023/0291657 | A1* | 9/2023 | Cawley | H04L 41/147 |
| 2023/0336564 | A1* | 10/2023 | Danielpour | G06N 20/00 |
| 2024/0303149 | A1* | 9/2024 | Chen | G06F 11/079 |
| 2024/0403662 | A1* | 12/2024 | Schell | G06N 20/00 |
| 2025/0086045 | A1* | 3/2025 | Barnes | G06F 11/079 |
| 2025/0106231 | A1* | 3/2025 | Tholar | H04L 41/16 |
| 2025/0301003 | A1* | 9/2025 | Mordovtsev | H04L 63/1425 |

* cited by examiner

302

| Label ID | Label |
|---|---|
| 1010 | Application: Application 1, Service: Service x1 |
| 1011 | Application: Application 1, Service: Service x2 |
| . . . | . . . |
| Other Label IDs | Other Labels |

304

| Metric ID | Metric Name |
|---|---|
| 3 | Database Alert Count |
| 4 | Container Alert Count |
| 5 | Log Error Count |
| . . . | . . . |
| Other Label IDs | Other Metric Names |

306

| Context ID | Context |
|---|---|
| 2000 | Application: Application 1, Service: Service x1 |
| 2001 | Application: Application 1, Service: Service x2 |
| . . . | . . . |
| Other Context IDs | Other Contexts |

*FIG. 3*

402

| Context ID | Label ID | Metric ID |
|---|---|---|
| 2000 | 3 | 3 |
| 2000 | 4 | 4 |
| 2000 | 5 | 5 |
| 2001 | 3 | 3 |
| 2001 | 4 | 4 |
| 2001 | 5 | 5 |
| . . . | . . . | . . . |
| Other Mapped Context IDs | Other Mapped Label IDs | Other Mapped Metric IDs |

*FIG. 4*

502

| Metric Time | Label ID | Metric ID | Value | Normal Range |
|---|---|---|---|---|
| MMDDYYY 10:50:00 | 1010 | 3 | 8 | 2 |
| MMDDYYY 10:50:00 | 1010 | 4 | 0 | 0 |
| MMDDYYY 10:50:00 | 1010 | 5 | 33 | 30 |
| MMDDYYY 10:50:00 | 1011 | 3 | 10 | 2 |
| MMDDYYY 10:50:00 | 1011 | 4 | 7 | 0 |
| MMDDYYY 10:50:00 | 1011 | 5 | 52 | 30 |
| . . . | . . . | . . . | . . . | . . . |
| Other Metric Times | Other Label IDs | Other Metric IDs | Other Values | Other Normal Ranges |

*FIG. 5*

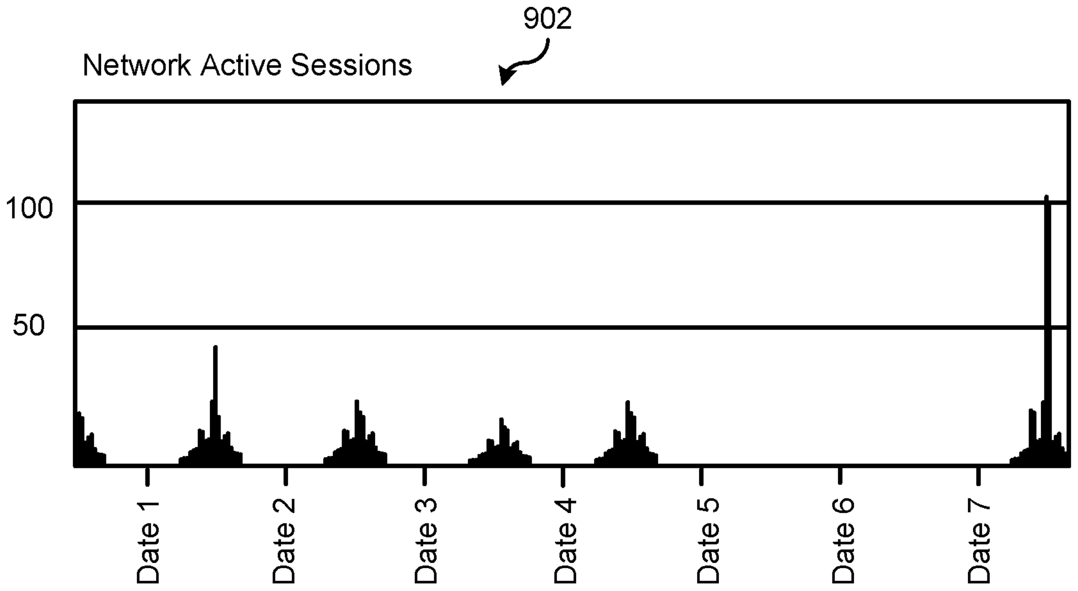
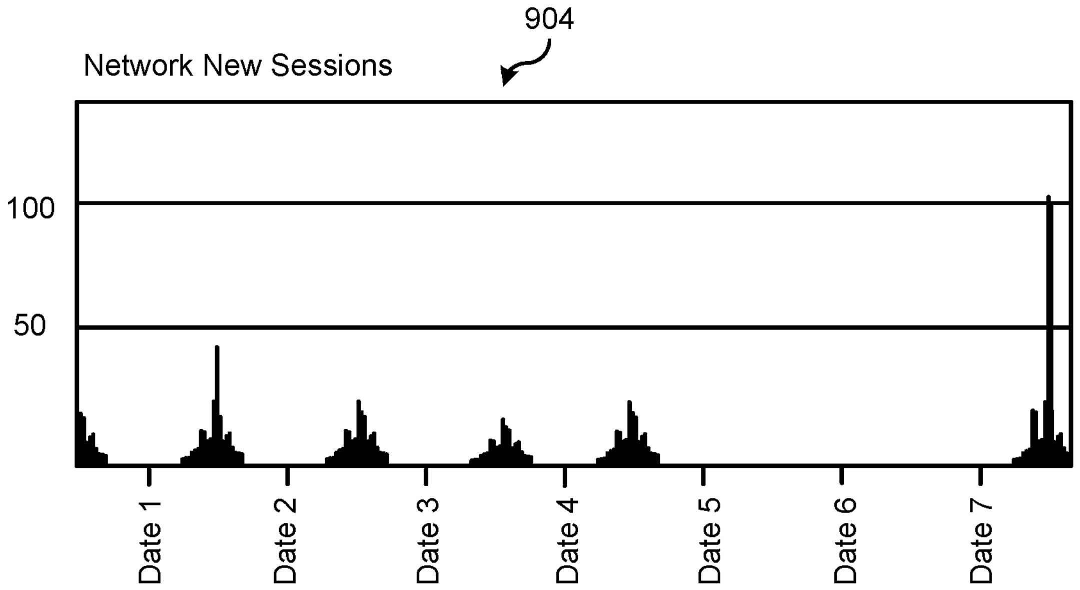
FIG. 9A

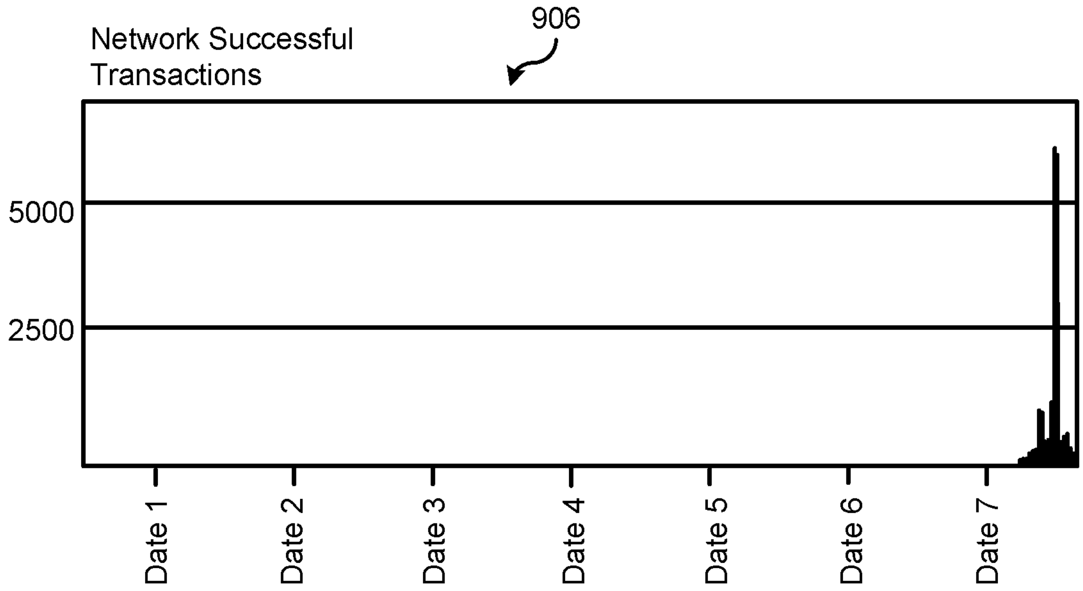
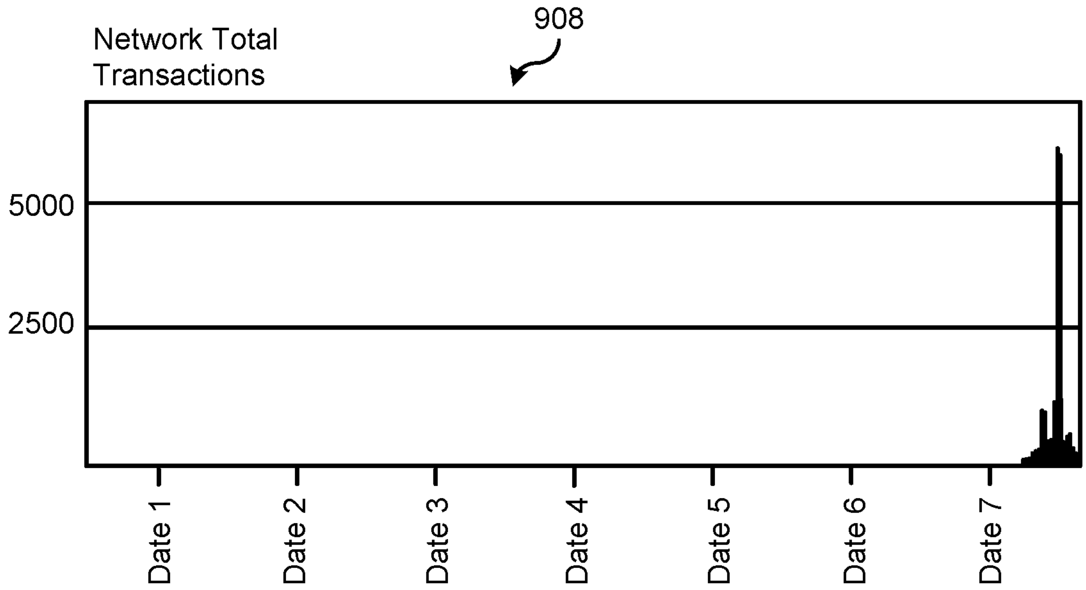
FIG. 9B

MULTI-CONTEXTUAL ANOMALY DETECTION

BACKGROUND

Anomaly detection refers to identifying data values that deviate from an observed norm. Oftentimes anomaly detection may indicate an issue that requires attention. For example, in the context of network traffic, anomaly detection may include identifying traffic loads that deviate from historical norms, which may indicate a service outage or a network intrusion event. Anomaly detection may also be used to identify the source of the issue so that mitigative action can be performed. One problem that arises in anomaly detection is early detection. Oftentimes issues are identified when it is too late. Services may have been down for too long or a network intrusion may have already occurred by the time the issue is identified. Systems that attempt to provide early warning oftentimes produce false positive warnings.

False positive warnings may result from the massive scale of data being analyzed using a single analysis technique, statistical fluctuations that aren't real anomalies, and the tuning of models that overfit data indicative of anomalies of concern that flags too many anomalies in the input data. False positive warnings may cause undue burden on computer systems and networks. For example, investigating these false positive warnings may require processing and memory power to trace the root cause of non-existent or benign anomalies, cause network downtimes, and hamper investigations into anomalies that should be mitigated.

On the other end of the spectrum, tuning detection systems in a more restrictive way may result in underfitting the data, which causes false negative reporting. False negative reporting may result in failing to detect anomalies that should be investigated, leading to extended service outages, network intrusions, or other issues in network systems or other systems in which anomalies may indicate a problem. These and other issues may exist in systems that attempt to detect anomalies.

SUMMARY

Various systems and methods may address the foregoing and other problems. For example, to address false positive and negative results from machine learning models for anomaly detection, the system may aggregate the outputs of a plurality of machine learning models that are each trained to detect anomalies. Each machine learning model may be trained to learn a respective behavioral pattern of a given metric to detect an anomaly. Each machine learning may generate an anomaly score based on a respective learned behavioral pattern.

The system may generate an aggregate anomaly score based on the anomaly scores from the machine learning models, thereby detecting anomalies based on different behavioral patterns of the same metric. In this way, the system may determine whether a data value of a metric is an anomaly based on multiple learned behaviors of the metric. For example, in operation, the system may access a data value to determine whether the data value is anomalous. The system may provide the data value as input to the plurality of machine learning models, which may each output a respective anomaly score. Each anomaly score may represent a prediction, by the machine learning model that generated the anomaly score, that the data value is anomalous.

The machine learning models may use different techniques from one another that depend on the behavioral pattern that each respective machine learning model will be trained to learn. For example, a first machine learning model may be trained on a time series of historical data values of a metric to learn seasonality and trending behavior of the metric. Based on the learned seasonality and trending behavior, the first machine learning model may forecast upper and lower bounds of expected data values for a given point in time. The system may analyze a data value at a particular date or time, determine a deviation of the data value from the forecasted upper and lower bounds for the particular date or time, and generate a first anomaly score based on the deviation.

A second machine learning model may be trained on the time series of historical data values of the metric to learn rarest occurrence behavior of the metric. For example, second machine learning model may learn data distributions from the historical data values and output a probability that a data value for the particular date and time is within the data distribution for that particular date and time. The system may generate a second anomaly score based on the probability.

A third machine learning model may be trained on multiple metrics collectively within a context, which ensure that the metrics are related to one another. The third machine learning model may be trained to learn combinations of values of the metrics that occur together. In this way, the system may determine, using the third machine learning model, whether the data value, together with other data values, are expected. The system may output a third anomaly score based on the probability that the observed data values and related other data values are expected. It should be noted that the terms "first," "second," and "third" do not denote an order or requirement that one of terms be required. For example, a second machine learning model may be omitted such that only the first and third machine learning models are used.

In some examples, the system may monitor detected anomalies over time so that a duration of an anomaly for a given metric may be used in the aggregate anomaly score. For example, the system may generate a duration score that is based on a duration of time that an anomaly was previously detected for a given metric and is currently being detected. The duration score may be positively correlated with the duration of time. The system may aggregate the duration score with the anomaly scores from the machine learning models to generate the aggregate anomaly score. In this way, the aggregate anomaly score takes into account a duration in which the anomaly has persisted.

The system may implement the plurality of machine learning models using a pluggable architecture in which different machine learning models may be added and/or removed as needed based on the context in which anomaly detection is performed. For example, a user may select machine learning models that are to be used for anomaly detection. In this way, each user may specify machine learning models—and therefore which behaviors of a metric—to be used for anomaly detection.

BRIEF DESCRIPTION OF THE DRAWINGS

Features of the present disclosure may be illustrated by way of example and not limited in the following figure(s), in which like numerals indicate like elements, in which:

FIG. 3 shows a set of data structures for storing labels, metrics, and contextual information for multi-context anomaly detection, according to an implementation.

FIG. 4 shows a data structure for storing mappings between identifiers for contextual information, labels, and metrics, according to an implementation.

FIG. 5 shows a data structure for storing duration and historical data values for multi-context anomaly detection, according to an implementation.

FIG. 9A shows illustrative graphs of case studies using anomaly detection in client network traffic data, according to an implementation.

FIG. 9B shows illustrative graphs of case studies using anomaly detection in client network traffic data, according to an implementation.

DETAILED DESCRIPTION

Figure 1:
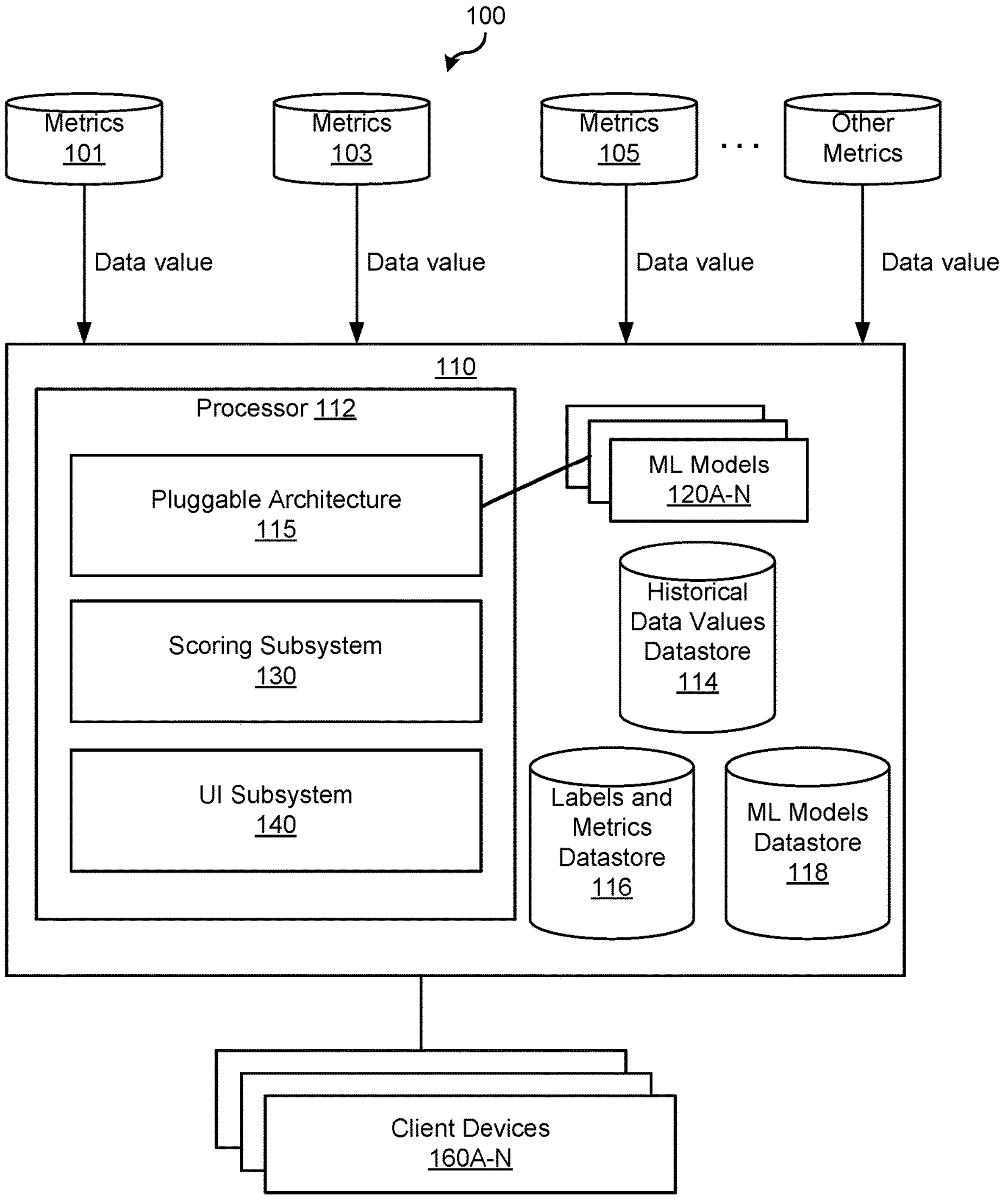
FIG. 1 shows an illustrative system for multi-context anomaly detection using a pluggable architecture for machine learning models that each learns different behaviors of a given metric, according to an implementation.

FIG. 1 shows an illustrative system 100 for multi-context anomaly detection using a pluggable architecture 115 for machine learning models 120A-N that each learns different behaviors of a given metric 101, 103, 105 (or other metric), according to an implementation. As shown in FIG. 1, the system 100 may include a computer system 110, one or more client devices 160 (illustrated as client devices 160A-N), and/or other components. The computer system 110 may detect anomalies based on multi-contextual metrics, such as metrics 101, 103, 105, and/or other metrics. Reference will be made to "metrics 101-105" when describing the metrics for convenience only, since other numbers of metrics may be used. Each metric 101-105 may refer to a quantitative value. For clarity of understanding, in a weather domain, an example of a metric 101 may be a temperature value, an example of a metric 103 may be a humidity value, and an example of a metric 105 may be a precipitation value. It should be noted that the particular type of metrics 101-105 will vary depending on the particular implementation of the computer system 110.

Each metric 101-105 may be associated with a context. A context may refer to information that indicates a source with which a metric is associated. Continuing the weather domain examples, an example of a context may be a geographic location for which the temperature, humidity, and precipitation relate. The data value of each metric 101-105 may be associated with a time value that indicates a date and/or time at which the data value occurred. For example, the temperature (value of a metric 101) at a given location (context) that occurred at a specific date and/or time (time value) may be stored in association with one another. This association may be stored in a time series for historical analysis and model training.

The computer system 110 may access the metrics 101-105 from various sources, depending on the context of these metrics. For example, metrics 101-105 may relate to a computer network domain, as will be described in other examples throughout this disclosure. In the computer network domain, the computer system 110 may obtain a metric 101-105 from one or more network devices of a monitored system (not shown). In another example, for application-level contexts, the computer system 110 may obtain a metric 101-105 from one or more applications or services executing on the monitored system. Thus, as will be apparent, the metrics 101-105 may relate to different contexts and be accessed from a wide range of sources.

The computer system 110 may include one or more processors 112, a historical data values datastore 114, a labels and metrics datastore116, a machine learning models datastore 118 (referred to as "ML models datastore 118"), and/or other components. The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some embodiments, processor 112 may comprise a plurality of processing units. These processing units may be physically located within the same device, or processor 112 may represent processing functionality of a plurality of devices operating in coordination.

As shown in FIG. 1, processor 112 is programmed to execute one or more computer program components. The computer program components may include software programs and/or algorithms coded and/or otherwise embedded in processor 112, for example. The one or more computer program components or features may include a pluggable architecture 115, a scoring subsystem 130, a user interface (UI) subsystem 140, and/or other components or functionality.

Processor 112 may be configured to execute or implement 115, 120, 130, and 140 by software; hardware; firmware; some combination of software, hardware, and/or firmware; and/or other mechanisms for configuring processing capabilities on processor 112. It should be appreciated that although 115, 120, 130, and 140 are illustrated in FIG. 1 as being co-located in the computer system 110, one or more of the components or features 115, 120, 130, and 140 may be located remotely from the other components or features. The description of the functionality provided by the different components or features 115, 120, 130, and 140 described below is for illustrative purposes, and is not intended to be limiting, as any of the components or features 115, 120, 130, and 140 may provide more or less functionality than is described, which is not to imply that other descriptions are limiting. For example, one or more of the components or features 115, 120, 130, and 140 may be eliminated, and some or all of its functionality may be provided by others of the components or features 115, 120, 130, and 140, again which is not to imply that other descriptions are limiting. As another example, processor 112 may include one or more additional components that may perform some or all of the functionality attributed below to one of the components or features 115, 120, 130, and 140.

The pluggable architecture 115 may include a plurality of (two or more) ML models 120A-N. Each ML model 120A-N may be trained to detect an anomaly from one or more metrics 101-105 based on a respective behavior of that metric. For example, ML model 120A may be trained to detect whether a given value of a metric 101 is anomalous based on a first behavior of the metric 101. ML model 120B may be trained to detect whether the given value of the metric 101 is anomalous based on a second behavior of the metric 101. ML model 120N may be trained to detect whether a given value of the metric 101 is anomalous based on a third behavior of the metric 101. Each of the ML models 120A-N may be trained to detect anomalous values in other metrics 103-105 as well or instead. The ML models 120A-N may be trained to detect anomalous values (also referred to herein as "anomalies") based on historical data values of various metrics 101-105. The historical data values may be stored, for example, in the historical data values datastore 114 for training and/or re-training purposes. The historical data values stored in the historical data values datastore114 may be based on live data values that are stored for training and/or curated data values that are selected for training and/or re-training.

Continuing the weather domain examples, the output of the ML model 120A for a real-time temperature value (which is an example of a metric 101) may represent an assessment of whether the real-time temperature value is anomalous based on a first behavior of temperatures values observed in a training dataset. The output of the ML model 120B for the real-time temperature value may represent an assessment of whether the real-time temperature value is anomalous based on a second behavior of temperatures values observed in the training dataset. The output of the ML model 120N for the real-time temperature value may represent an assessment of whether the real-time temperature value is anomalous based on a third behavior of temperatures values observed in the training dataset. Each of the ML models 120A-N may be trained to learn respective behaviors of other metrics, such as precipitation and humidity as well or instead.

The output of each ML model 120A-N may include an anomaly score. Each anomaly score may represent an assessment by a corresponding ML model 120A-N that a data value for a metric 101-105 being analyzed is anomalous. Each anomaly score may be normalized to be equal to a value between 0.0 and 1.0, in which 0.0 indicates a minimum likelihood of anomaly and 1.0 indicates a maximum likelihood of anomaly according to the respective behavior modeled by a given ML model 120A-N.

Thus, collectively, the anomaly scores of the ML models 120A-N provide an aggregate view of whether or not a data value for a metric 101-105 analyzed by each of the ML models 120A-N is anomalous based on multiple behaviors of that metric. The ML models 120A-N may be further executed on other metrics 103, 105, such as humidity and precipitation metrics as well or instead. Further details of the ML models 120A-N and the respective learned behaviors are described in FIGS. 2A and 2B.

The anomaly scores outputted by the ML models 120A-N may be provided to the scoring subsystem 130, which may aggregate the anomaly scores and generate an aggregate anomaly score. The aggregate anomaly score refers to an assessment of whether or not a data value of a metric 101-105 is anomalous based on multiple behaviors of the metric 101-105. Each anomaly score may be weighted based on a weighting value that is assigned to one or more corresponding ML models 120A-N.

In some implementations, the scoring subsystem 130 may generate a duration score based on a duration time associated with each anomaly score. The duration time may indicate a length of time that a detected anomaly has persisted, as indicated by the date and/or time associated with each value of the metric 101-105 being analyzed. The scoring subsystem 130 may assign a larger duration score for longer duration times. For example, the scoring subsystem 130 may increment the duration score based on the duration time up to a maximum value. In a particular example, the scoring subsystem 130 may add 0.1 to the duration score for each 5 minutes of duration time, with a maximum value of 1.0. The scoring subsystem 130 may aggregate the duration score with the aggregated anomaly scores to generate the aggregate anomaly score. In some of these implementations, the duration score may be weighted by its own weighting value, similar to the manner in which the anomaly scores are weighted by their respective weighting value.

It should be noted that the weighting values, whether for respective ML models 120A-N or duration scores, may be adjusted as needed and/or automatically. In some implementations, the weighting values are defaulted to be equal to one another so that the anomaly scores and duration score are each weighted equally with respect to one another. In some implementations, the scoring subsystem 130 may assign a mitigation category based on the aggregate anomaly score. Further details of the scoring subsystem 130 are described in FIGS. 2A and 2B.

The user interface (UI) subsystem 140 may provide the aggregate anomaly score and/or mitigative action via a user interface. Furthermore, in some implementations, the pluggable architecture 115 facilitates the addition or removal of various ML models 120A-N as needed. In operation, the UI subsystem 140 may provide a configuration UI (not illustrated) for receiving input that configures the pluggable architecture 115. For example, the configuration UI may receive a specification of one or more ML models 120A-N to include or exclude in the pluggable architecture 115. Thus, users may be able to decide which ML models 120A-N to use for anomaly detection. In some implementations, each ML model 120A-N is trained specifically for a given metric 101-105. In these implementations, the specific ML models 120A-N and corresponding metric 101-105 that are used may be configured for detecting anomalies.

Figure 2A:
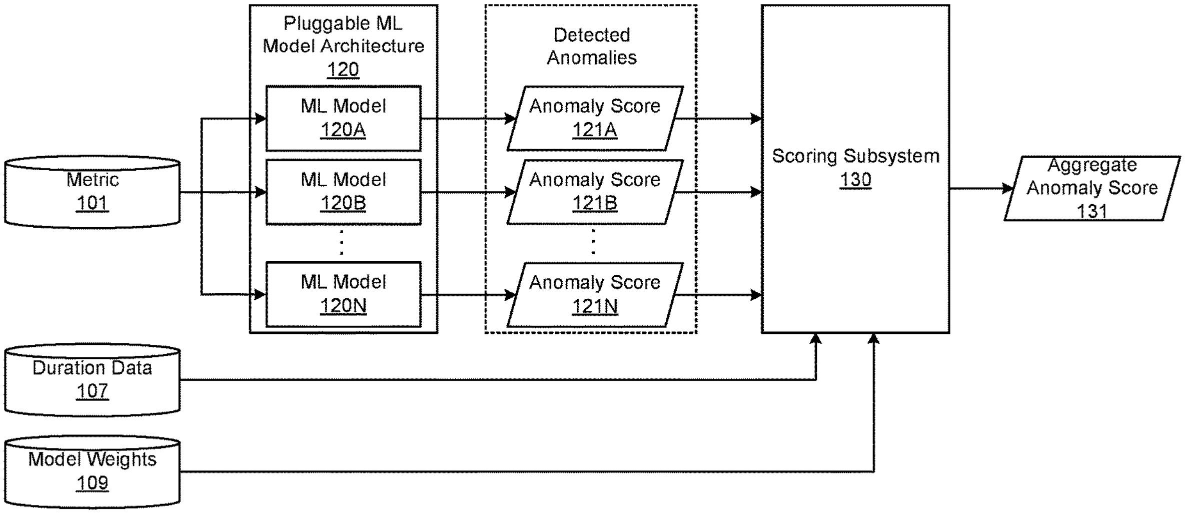
FIG. 2A shows a pluggable architecture for machine learning models trained to detect anomalies using a metric and a scoring subsystem for aggregating the anomalies, according to an implementation.

FIG. 2A shows a pluggable architecture for machine learning models 120A-N trained to detect anomalies using a metric 101 and a scoring subsystem 130 for aggregating the anomalies, according to an implementation. Each ML model 120A-N may be trained to generate a respective anomaly score 121A-N, which may be normalized to be a value between 0 and 1, in which 1 indicates a maximum likelihood of anomaly. Examples of anomaly score ranges and corresponding risk of each range are provided in Table 1.

TABLE 1

Example of configurable ranges for anomaly scores 121A-N.

| Anomaly Score Range | Anomaly risk |
|---|---|
| 0 to 0.3 | Normal (non-anomalous) |
| 0.3 to 0.45 | Low |
| 0.45 to 0.6 | Medium |
| 0.6 to 1.0 | High (highest likelihood of anomaly) |

The ML models 120A-N may each be trained using respective machine learning techniques to detect respective behaviors of the metric 101. For example, the ML model 120A may be trained to learn seasonality and trend in historical data values used as training data for the metric 101. To do so, ML model 120A may be trained to analyze a time series of values for the metric 101 to learn seasonality and trends in the time series. For example, the ML model 120A may analyze seasonality and trend in the data to generate feature prediction. Thus, for a given point in time, the ML model 120A may determine whether a data value being assessed at the given point is anomalous compared to similar points in time (seasonally or trend adjusted). ML model 120A may also generate an upper bound and a lower bound by analyzing uncertainty based on the historical seasonal and trend data. If an analyzed input data value for the metric 101 is outside the upper and lower bounds, then the ML model 120A may determine that the data value the metric 101 is anomalous.

One example of the ML model 120A is the PROPHET forecasting model, which may be implemented using the Python or R programming languages. PROPHET may use an additive model to forecast time series data in which non-linear trends are fit with yearly, weekly, and daily seasonality. In addition, any holiday effects may be taken into account. In this way, the ML model 120A may use forecasting to predict what a data value should be at a given point in time based on historical seasonality and holiday effects (if any). For example, the ML model 120A may forecast upper and lower bounds for the given point in time. The resulting anomaly score 121A may be generated based on a deviation of the data value from the forecasted upper and lower bounds. An example of generating the anomaly score 121A using the PROPHET forecasting model is provided below for illustration. The example will use the following definitions:

- Observed Value: The actual value of the data point
- PROPHET Predicted Value: Predicted value provided by PROPHET model
- PROPHET Upper Bound: Predicted Upper Boundary provided by PROPHET model
- PROPHET Lower Bound: Predicted Lower Boundary provided by PROPHET model
- Deviation: The delta between PROPHET Bound and the Observed value
- Calculated Thresholds: Utilizing the PROPHET provided bounds generates too much noise, so we utilize a custom threshold which is the PROPHET Bound minus PROPHET Predicted value multiplied by the Boundary Multiplier
- Boundary Multiplier: Used to determine the upper threshold by which observed values will be measured
- Normalized Score: Deviation divided by the respective upper or lower threshold, we target a value from zero to one, anything greater than 1 is set to 1, with 1 being far out of the range and a likely anomaly.

Calculation Logic

- If Observed Value>PROPHET Upper Bound, then:
- Upper Threshold=(PROPHET Upper Bound−PROPHET Predicted Value)*Boundary Multiplier; Deviation=Observed Value—PROPHET Upper Bound;
- Normalized Score=Deviation/Upper Threshold; Else if Observed Value<PROPHET Lower Bound, then
- Lower Threshold=(PROPHET Predicted Value−PROPHET Lower Bound)*Boundary Multiplier; Deviation=PROPHET Lower Bound−Observed Value;
- Normalized Score=Deviation/Lower Threshold;

Examples of Values:

- Observed Value=3
- PROPHET Predicted Value=0.62
- PROPHET Upper Bound=0.87
- PROPHET Lower Bound=0.36
- Boundary Multiplier=10 Calculations
- Calculated Upper Threshold=(0.87-0.62)*10=2.5
- Calculated Lower Threshold=(0.36-0.62)*10=−2.6
- Observed Value to PROPHET Upper Bound Deviation=3−0.87=2.13
- Normalized Score=2.13/2.5=0.85 If>1 the score may be set to 1.

The ML model 120B may be trained to learn rarest occurrence involving the metric 101. For rarest occurrence, the ML model 120B may be trained to analyze the probability of a data distribution and generate a probability of a given value occurring in the data distribution. If the probability of a data value for the metric 101 is less than a threshold probability, then the ML model 120A may determine that the data value the metric 101 is anomalous. Thus, the anomaly score 121B from the ML model 120B may depend on the probability that the data value being assessed is within the predicted data distribution. For example, the anomaly score 121B may be based on a deviation of the data value from the predicted distribution boundary. One example of rarest occurrence modeling may include a robust covariance approach.

Robust covariance methods may remove extreme outliers from a distribution. In one example, robust covariance models may assume that at least a portion of a distribution is “normal” and is not an outlier. Robust covariance may be trained to analyze a set of random samples to estimate statistics such as the mean, sum, and absolute sum. Distances of each of these samples from one another based on the statistics may be learned and sorted. The values with the smallest distances may be used to update the statistics for the random samples, and a subset with the lowest absolute sum is considered for computation until convergence. The estimate with the smallest absolute sum is returned as output for filtering the distribution. The ML model 120B may use the filtered distribution for the prediction distribution based on which the anomaly score 121B is determined. An example of generating the anomaly score 121B using robust covariance is provided below for illustration. The example will use the following definitions:

- Observed Value: The actual value of the data point
- Standard Deviation: Calculated from the Observed Value dataset
- Decision Score: It is equal to the shifted Mahalanobis distances which is provided by the Robust covariance model. This means the higher the value the data is farther away from the norms. The Mahalanobis distance is a measure of the distance between a point P and a distribution D.
- Normalized Score: Final score, 1 being highly anomalous and 0 being normal Calculation Logic:

- Normalized Score=1−(1/(SQRT(Decision Score)/Standard Deviation))

Example of Values:

- Observed Value=0.3729983333333
- Decision Score=138.82374363
- Standard Deviation=0.01324 Calculation
- Normalized Score=1−(1/(SQRT(138.82374363)/0.01324))=0.998

The ML model 120N may be trained to learn normal observations of a combination of two or more of the metrics 101-105. For the combination, the ML model 120N may be trained to learn a normal observation set of a combination of values for two or more metrics 101-105. Thus, the ML model 120N may detect any abnormal combination of values in a real-time combination of values. One approach to model the combination is through a Bidirectional Generative Adversarial Network (BiGAN). The anomaly score 121N generated by the ML model 120N may be based on the discriminator output of the BiGAN.

A BiGAN is a Generative Adversarial Network (GAN) with an encoder component. A GAN includes a generator and a discriminator. The generator learns how to generate data values from a latent space (noise). The objective of the discriminator is altered to classify between a real data value (in the historical data set) and a "synthetic" sample (one that is anomalous). The discriminator may also make the classification based on an encoder/decoder architecture. An encoder may encode a dataset in a way to compress the data while the decoder may attempt to recreate the original dataset from the compressed data. If decoding a test dataset is successful (as determined by being similar or identical to the original dataset), then the test dataset may be deemed to be equivalent to the original dataset. Thus, in this context, the encoder/decoder may be used to determine whether the data value is anomalous based on historical data values encoded by the encoder.

An example of generating the anomaly score 121BN using BIGAN is provided below for illustration. The example will use the following definitions:

Observed Value: The set of actual value for a given context at a given time.

Discriminator Output: The model output, Closer to 1 is normal and Closer to 0 is abnormal.

Normalized Score: Final score, 1 being anomalous and 0 being normal.

Normalized Score=1—'Discriminator Output'

TABLE 2

Example of values for the anomaly score 121N. In this example, the Normalized Score = 1 − 0.35 = 0.65

| Timestamp | LabelId_MetricId | Observed Value |
|---|---|---|
| 2022-07-07 10:20:00.000 | 226719_88 | 4 |
| 2022-07-07 10:20:00.000 | 226719_81 | 33 |
| 2022-07-07 10:20:00.000 | 226719_82 | 41 |
| 2022-07-07 10:20:00.000 | 226719_85 | 6.951171875 |
| 2022-07-07 10:20:00.000 | 226719_86 | 8.3798828125 |
| 2022-07-07 10:20:00.000 | 226719_78 | 7 |
| 2022-07-07 10:20:00.000 | 226719_80 | 7 |
| 2022-07-07 10:20:00.000 | 226719_87 | 25.9605714285714 |
| 2022-07-07 10:20:00.000 | 226719_83 | 2 |

In some implementations, the scoring subsystem 130 may generate a duration score based on a duration time associated with each anomaly score 121A-N. The duration time may indicate a length of time that a detected anomaly has persisted, as indicated by the date and/or time associated with the data value of metric 101. The scoring subsystem 130 may assign a larger duration score for longer duration times. For example, the scoring subsystem 130 may increment the duration score based on the duration time up to a maximum value. In a particular example, the scoring subsystem 130 may add 0.1 to the duration score for each 5 minutes of duration time, with a maximum value of 1.0. The scoring subsystem 130 may aggregate the duration score with the aggregated anomaly scores to generate the aggregate anomaly score. In some of these implementations, the duration score may be weighted by its own weighting value, similar to the manner in which the anomaly scores are weighted by their respective weighting value. Using the duration score enables a distinction between real anomalies from statistical fluctuations, which may occur intermittently but briefly over time.

The scoring subsystem 130 may aggregate the anomaly scores 121A-N to generate an aggregate anomaly score 131. The scoring subsystem 130 may define the aggregate anomaly score 131, (y), as a function (f(x)), which may be denoted by equation 1:

$$y=f(x)=(s(x)+r(x)+c(x)+d(x))/4 \qquad (1),$$

in which:

y=f(x)=the aggregate anomaly score 131, which may be a normalized anomaly score between 0 to 1;

s(x)=the anomaly score 121A output by the ML model 120A (seasonality and trend);

r(x)=the anomaly score 121B output by the ML model 120B (rarest occurrence);

c(x)=the anomaly score 121N output by the ML model 120N (combined related metrics);

d(x)=the duration score indicating the duration of the anomalous reading based on the date or time associated with the metric 101.

In equation (1), the model weightings are 1 for each of s(x), r(x), c(x), and d(x). Thus, s(x), r(x), c(x), and d(x) are equally weighted according to the above. The normalization factor of 4 may be used since four normalized scores each using the same scale (in this case, values between 0.0 to 1.0) are used for each of s(x), r(x), c(x), and d(x). It should be noted that other model weightings may be used to weight some anomaly scores higher than others.

In some implementations, the scoring subsystem 130 may assign a mitigation category based on the aggregate anomaly score. For example, Table 3 illustrates non-limiting examples of the aggregate anomaly score ranges and corresponding mitigation categories.

TABLE 3 illustrates examples of mitigation categories.

| Aggregate Anomaly Score | Mitigation Category |
|---|---|
| 0.0-0.5 | Investigate |
| 0.51-0.75 | Warn |
| 0.76-1.0 | Escalate |

Figure 2B:
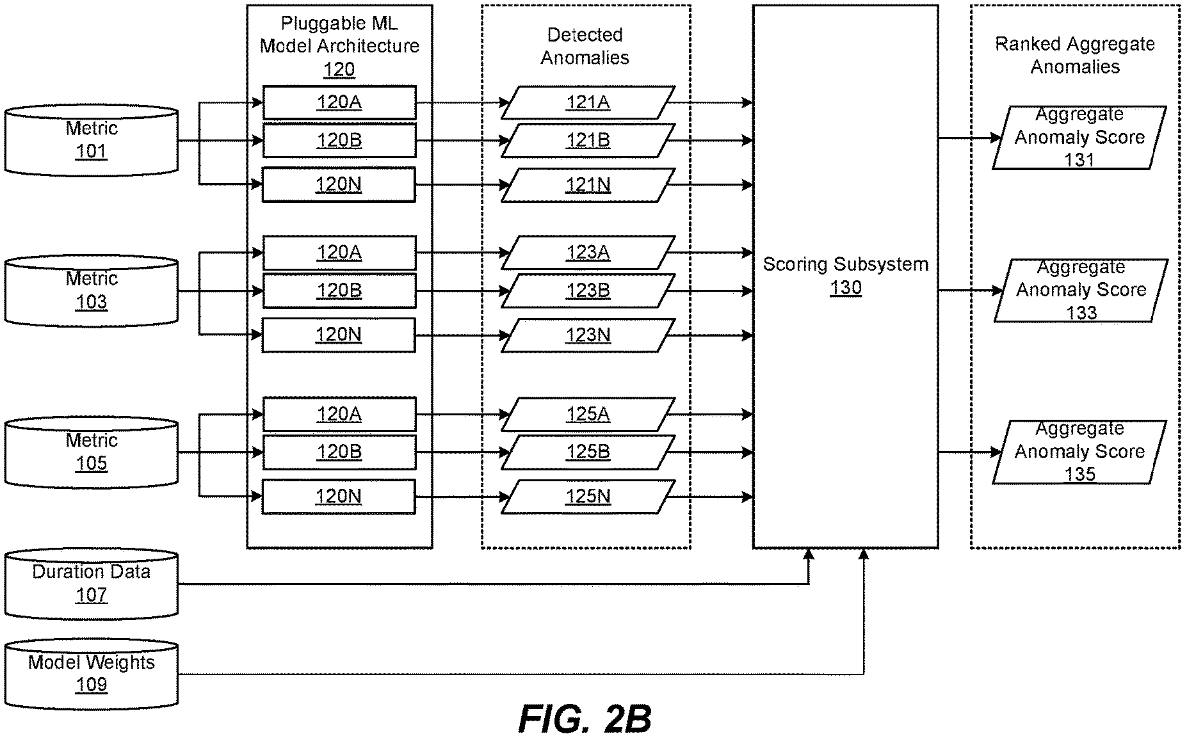
FIG. 2B shows the pluggable architecture and scoring subsystem illustrated in FIG. 2A, but with multiple metrics to generate different sets of aggregate anomaly scores that are ranked with respect to one another, according to an implementation.

It should be noted that the ML models 120A-N of the pluggable architecture 115 may be trained to learn respective behaviors of different metrics. For example, FIG. 2B shows the pluggable architecture 115 and scoring subsystem 130 illustrated in FIG. 2A, but with multiple metrics 101, 103, 105 to generate different sets of aggregate anomaly scores 121A-N, 123A-N, 125A-N, that are ranked with respect to one another, according to an implementation. In this implementation, the scoring subsystem 130 may rank the aggregate anomaly scores 131, 133, and 135 generated from the respective anomaly scores 121A-N, 123A-N, and 125A-N.

FIG. 3 shows a set of data structures 302, 304, 306 for storing labels, metrics, and contextual information for multi-context anomaly detection, according to an implementation.

Data structure 302 may store a set of label identifiers (IDs) and labels that indicate a context of a given metric that is linked with the label ID. For example, as shown, label ID 1010 identifies a label that indicates a context "Application 1" and "Service x1." An anomalous value of a metric 101-105 associated with this label ID indicates that Application 1 and Service x1 may be the culprit of the anomaly.

Data structure 304 may store a set of metric IDs and corresponding metric name for a given metric 101-105. For example, metric ID 3 identifies a "database alert count" metric.

Data structure 306 may store a set of context IDs and corresponding context. For example, context ID 2000 identifies "Application 1 and Service x1" contexts.

FIG. 4 shows a data structure 402 for storing mappings between identifiers for contextual information, labels, and metrics, according to an implementation. A context ID may refer to an identifier that identifies a group of labels and metrics. For example, if an application has three services, then the application name may be used as a context name, and each service name may be used as a label. As shown, data structure 402 may store an association between a context ID, a label ID, and a metric ID. In this way, metric IDs that identify metrics 101-105 may be mapped to their corresponding label IDs and context IDs, enabling the computer system 110 to determine a context and label for any given metric 101-105.

FIG. 5 shows a data structure 502 for storing duration and historical data values for multi-context anomaly detection, according to an implementation. As shown, data structure 502 may store an association between a metric time (which may be a date and/or time at which a given value for a metric 101-105 identified by the metric ID was observed), label ID, metric ID, value, and normal range for the metric. Data structure 502 may therefore be used to identify a value of a metric 101-105, when that value was observed to be able to generate a duration score, and a normal range as learned from one of the models 120A-N.

Each of the data structures 302, 304, 306, 402, and 502 may be implemented in a relational database table and/or other data structure. These or other data structures may be stored in the label and metrics datastore116.

Examples of anomaly scores 121A-N based on respective ML models 120A-N will now be described in with reference to the data structure 502 shown in FIG. 5 and the components illustrated in FIGS. 1, 2A, and 2B. An anomaly score 121 may be generated based on a label ID-metric ID pair and their respective values. In this way, any anomalous values detected by the ML models 120A-N for a given metric ID may be matched to a corresponding label ID. Therefore, the source of any anomaly may be determined based on the corresponding label ID.

Seasonality and Trend Anomaly Score

The ML model 120A may generate an anomaly score 121A based on seasonality and trend behaviors, as given by s(x) in Equation 1. Each label ID-metric ID pair may be analyzed by the ML model 120A to generate a corresponding anomaly score for the pair. If the anomaly score indicates an anomaly has been detected, the metric ID and corresponding label ID may be used to determine the source of the anomaly.

The following shows examples of calculated anomaly scores 121A for seasonality and trends as determined by the ML model 120A, using PROPHET time series predictions based on historical data values.

For Label ID 1010:

- Label ID=1010, Metric ID=3, Time=10:50 AM, Value=8.0: s(x)=0.52.
- Label ID=1010, Metric ID=4, Time=10:50 AM, Value=0: s(x)=0.0.
- Label ID=1010, Metric ID=5, Time=10:50 AM, Value=33: s(x)=0.0.

For Label ID 1011:

- Label ID=1011, Metric ID=3, Time=10:50 AM, Value=10.0: s(x)=0.55.
- Label ID=1011, Metric ID=4, Time=10:50 AM, Value=7.0: s(x)=0.71.
- Label ID=1011, Metric ID=5, Time=10:50 AM, Value=52.0: s(x)=0.30.

Rarest Occurrence Anomaly Score

The ML model 120B may generate an anomaly score 121B based on rarest occurrence behavior, as given by r(x) in Equation 1. Each label ID-metric ID pair may be analyzed by the ML model 120B to generate a corresponding anomaly score for the pair. If the anomaly score indicates an anomaly has been detected, the metric ID and corresponding label ID may be used to determine the source of the anomaly.

The following shows examples of calculated anomaly scores 121B based on rarest occurrence as determined by the ML model 120B, using robust covariance based on historical data values. An anomaly score 121B may be based on the probability of the observed data value of a metric occurring based on the historical data values.

For Label ID 1010:

- Label ID=1010, Metric ID=3, Time=10:50 AM, Value=8.0: r(x)=0.0.
- Label ID=1010, Metric ID=4, Time=10:50 AM, Value=0: r(x)=0.0.
- Label ID=1010, Metric ID=5, Time=10:50 AM, Value=33: r(x)=0.0.

For Label ID 1011:

- Label ID=1011, Metric ID=3, Time=10:50 AM, Value=10.0: r(x)=0.0.
- Label ID=1011, Metric ID=4, Time=10:50 AM, Value=7.0: r(x)=1.0.
- Label ID=1011, Metric ID=5, Time=10:50 AM, Value=52.0: r(x)=0.0.

Context/Combination Anomaly Score

The ML model 120N may generate an anomaly score 121N based on combined metrics, as given by c(x) in Equation 1. Each Context ID-metric ID pair may be analyzed by the ML model 120N to generate a corresponding anomaly score for the pair. If the anomaly score indicates an anomaly has been detected, the metric ID and corresponding Context ID may be used to determine the source of the anomaly.

The following shows examples of calculated anomaly scores 121N based on a combination of related metrics as determined by the ML model 120N, using a BiGAN on historical data values. An anomaly score 121B may be based on the probability of the observed data values of a combination of metrics occurring based on the historical data values.

Thus, a given Context ID will be mapped to multiple metrics, and an anomaly score 121N is based on a probability that the combined values of the multiple metrics will occur in the historical data values. In other words, an anomaly score 121N represents a probability that the combined values of the multiple metrics are "normal" or has been seen in the historical data values.

For example, Table 4 below shows an example of context ID 2000 in which Metric IDs 3 4, and 5 and their paired label ID 1010 are combined and analyzed. In the result shown in Table 4, the combined label ID-metric ID pairs 1010_3, 1010_4, and 1010_5 and corresponding values resulted in in a predicted anomaly score of 0.0, indicating low probability of an anomaly. In other words, the combination of values 8.0, 0.0, 33.0 for the respective label IDS-metric pairs 1010_3, 1010_4, and 1010_5 is not out of the ordinary based on training from the historical data values.

| Context ID | Time | 1010_3 | 1010_4 | 1010_5 | c(x) |
|---|---|---|---|---|---|
| 2000 | 10:50AM | 8.0 | 0.0 | 33.0 | 0.0 |

For example, Table 5 below shows an example of context ID 2001 in which Metric IDs 3, 4, and 5 and their paired label ID 1011 are combined and analyzed. In the result shown in Table 5, the combined label ID-metric ID pairs 1011_3, 1011_4, and 1011_5 and corresponding values resulted in in a predicted anomaly score of 1.0, indicating high probability of an anomaly. In other words, the combination of values 10.0, 7.0, and 52.0 for the respective label IDS-metric pairs 1011_3, 1011_4, and 1011_5 is out of the ordinary (anomalous) based on training from the historical data values.

| Context ID | Time | 1011_3 | 1011_4 | 1011_5 | c(x) |
|---|---|---|---|---|---|
| 2001 | 10:50AM | 10.0 | 7.0 | 52.0 | 1.0 |

Duration Score

The scoring subsystem 130 may generate duration score based on a duration of time that a detected anomaly is active, as given by d(x) in Equation 1. Each time an anomaly is detected by any one of the ML models 120A-N, a fault start time may be recorded for the content ID (if relevant and known), label ID, and metric ID. In this way, if the anomaly persists after future iterations of anomaly detection, the future iterations may be able to determine a duration of the anomaly based on the fault start time and current time.

TABLE 6 below shows fault start times for label ID 1010:

| ID (Context ID_label ID_Metric ID) | Fault start time |
|---|---|
| 2000_1010_3 | 10:50 AM |
| 2000_1010_4 | 10:50 AM |
| 2000_1010_5 | 10:50 AM |

For Label ID1010:

- Label ID=1010, Metric ID=3, Time=10:50 AM, Value=8.0: d(x)=0.0.
- Label ID=1010, Metric ID=4, Time=10:50 AM, Value=0: d(x)=0.0.
- Label ID=1010, Metric ID=5, Time=10:50 AM, Value=33: d(x)=0.0.

Assuming the current time for this instance of anomaly detection is 10:50 AM, the duration score d(x) (anomaly score 121N in FIG. 2A) for each of the label_ID 1010 and metric IDs 3, 4, and 5 combinations are zero.

TABLE 7 below shows fault start times for label ID 1011:

| ID (Context ID_label ID_Metric ID) | Fault start time |
|---|---|
| 2001_1011_3 | 10:00 AM |
| 2001_1011_4 | 10:50 AM |
| 2001_1011_5 | 10:50 AM |

For Label ID 1011:

- Label ID=1011, Metric ID=3, Time=10:50 AM (fault start at 10:00), Value=10.0: d(x)=1.0.
- Label ID=1011, Metric ID=4, Time=10:50 AM, Value=7.0: d(x)=0.0.
- Label ID=1011, Metric ID=5, Time=10:50 AM, Value=52.0: d(x)=0.0.

Assuming the current time for this instance of anomaly detection is 10:50 AM, the duration score d(x) (anomaly score 121N in FIG. 2A) for each of the label_ID 1011 and metric IDs 4 and 5 combinations are zero. However, for the label ID 1011 and metric ID 3 pair, the duration is 50 minutes. For each five-minute duration, d(x) is incremented by 0.1 up to a maximum of 1.0. Thus, d(x)=1.0 for the label ID 1011 and metric ID 3 pair.

Aggregate Score

The scoring subsystem 130 may aggregate the anomaly scores 121A-N and the duration score to generate an aggregate score.

For context ID 2000, the scoring subsystem 130 may generate the following aggregate anomaly scores for each metric ID, as shown in Table 8 below. Each of the aggregate scores may be generated based on Equation 1.

TABLE 8

Example of aggregate anomaly scores for context ID 2000.

| | Metric ID 3 (Database Alert Count) | Metric ID 4 (Container Alert Count) | Metric ID 5 (Log Error Count) |
|---|---|---|---|
| Aggregate Anomaly Score | y(x) = (0.52 + 0 + 0 + 0)/4 = 0.13 | y(x) = (0 + 0 + 0 + 0)/4 = 0.0 | y(x) = (0 + 0 + 0 + 0)/4 = 0.0 |
| Anomaly Determination | Normal | Normal | Normal |

For context ID 2001, the scoring subsystem 130 may generate the following aggregate anomaly scores for each metric ID, as shown in Table 9 below. Each of the aggregate scores may be generated based on Equation 1.

TABLE 9

Example of aggregate anomaly scores for context ID 2001.

| | Metric ID 3 (Database Alert Count) | Metric ID 4 (Container Alert Count) | Metric ID 5 (Log Error Count) |
|---|---|---|---|
| Aggregate Anomaly Score | y(x) = (0.55 + 0 + 1 + 1)/4 = 0.63 | y(x) = (0.71 + 1 + 0 + 1)/4 = 0.67 | y(x) = (0.30 + 0 + 1 + 0)/4 = 0.32 |
| Anomaly Determination | High | High | Low |

Figure 6:
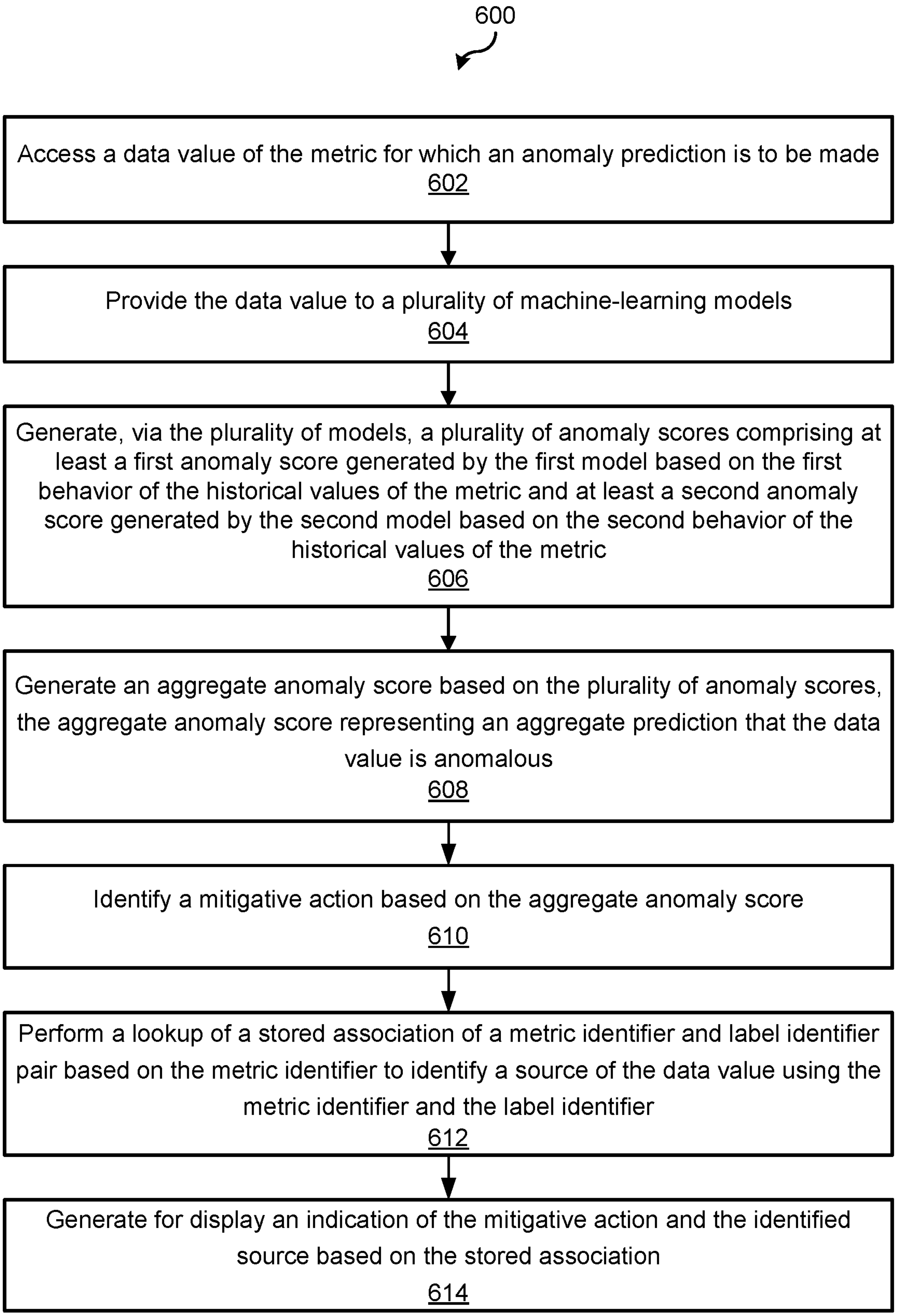
FIG. 6 shows an illustrative method for anomaly detection based on a plurality of machine learning models that learn multiple learned behaviors of a metric, according to an implementation.

FIG. 6 shows an illustrative method 600 for anomaly detection based on a plurality of machine learning models that learn multiple learned behaviors of a metric, according to an implementation.

At 602, the method 600 may include accessing a data value of the metric for which an anomaly prediction is to be made. For example, the metric may be any of the metrics 101-105 (or other metrics).

At 604, the method 600 may include providing the data value to the pluggable plurality of machine learning models (such as the ML models 120A-N of the pluggable architecture 115).

At 606, the method 600 may include generating, via the pluggable plurality of models, a plurality of anomaly scores (such as anomaly scores 121A-N). The anomaly scores may include at least a first anomaly score (such as any one of the anomaly scores 121A-N) generated by the first model (such as any one of the ML models 120A-N) based on the first behavior of the historical data values of the metric and at least a second anomaly score generated by the second model (such as any other one of the ML models 120A-N) based on the second behavior of the historical data values of the metric. Each anomaly score from among the plurality of anomaly scores represents a prediction that the data value is anomalous based on a respective machine learning model that models a corresponding behavior of the historical data values of the metric.

At 608, the method 600 may include generating an aggregate anomaly score (such as aggregate anomaly score 131) based on the plurality of anomaly scores, the aggregate anomaly score representing an aggregate prediction that the data value is anomalous.

At 610, the method 600 may include identifying a mitigative action based on the aggregate anomaly score. For example, the mitigative actions may be mapped to aggregate anomaly scores. Table 3 shows an example of such mapping.

At 612, the method 600 may include performing a lookup of a stored association of a metric identifier and label identifier pair based on the metric identifier to identify a source of the data value using the label identifier. For example, the lookup may be performed based on a query or other data recall action against one or more of the data structures 302, 304, 306, 402, and 502. For example, the source of the data value in a computer network domain may include various network devices such as switches, routers, hubs, application server devices, bridges, access points, and/or other devices that are involved in a computer network. Examples of metrics 101-105 in this domain may include a number of active network sessions, a number of new network sessions, a number of network transactions, and so forth. In an application services domain, the source of the data value may include a software application service, a specific software application, a specific routine of a software application, and so forth.

At 614, the method 600 may include generating for display an indication of the mitigative action and the identified source of the data value based on the stored association. For example, the UI subsystem 140 may generate data, for display via a user interface of a client device 160, an indication of the mitigative action and identified source.

It should be noted that the different sources may be provide different types of metrics 101-105. It should be further noted that the different sources may be arranged hierarchically so that identifying a source of the data value may have multiple sources. It this way, anomaly detection and reporting for the display may also be made hierarchically. For example, mitigative actions may be provided to engineers responsible for firewalls and/or to engineers responsible for specific server devices within a firewall. Likewise, mitigative actions may be provided to engineers responsible for application-level issues. Furthermore, the mitigative actions provided to various engineers may result from the same core issue. For example, an application that causes an anomaly may cause anomalous readings across a range of sources. In this example, the application may cause an endless loop of calls to an application service, which may make network calls to a server device. The endless loop of calls may therefore cause anomalous readings across a different range of sources. Each party responsible for each of the different range of sources may be alerted to the anomalous readings to aid in troubleshooting and mitigative efforts.

Figure 7:
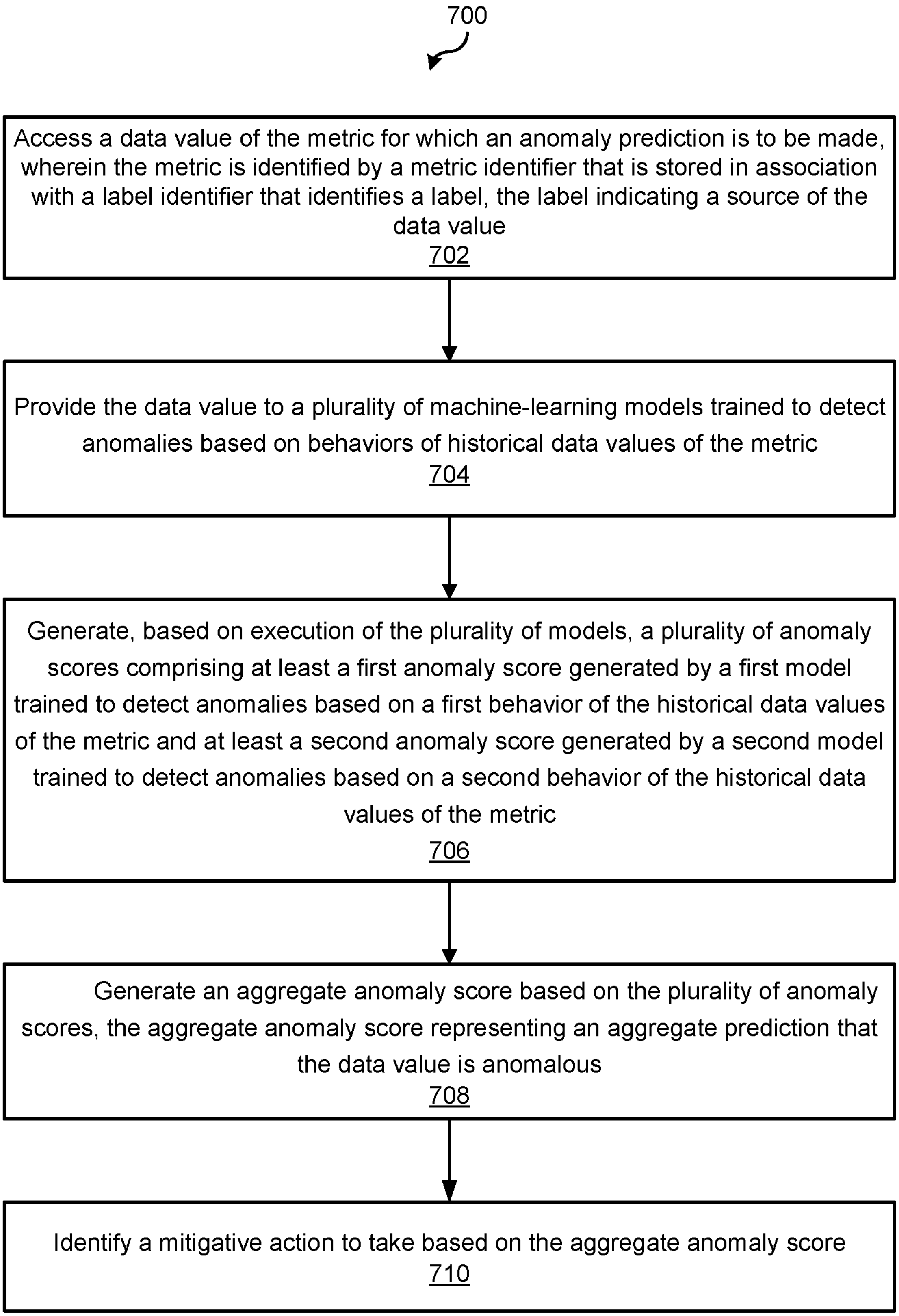
FIG. 7 shows another illustrative method for anomaly detection based on a plurality of machine learning models that learn multiple learned behaviors of a metric, according to an implementation.

FIG. 7 shows another illustrative method 700 for anomaly detection based on a plurality of machine learning models that learn multiple learned behaviors of a metric, according to an implementation.

At 702, the method 700 may include accessing a data value of the metric for which an anomaly prediction is to be made, wherein the metric is identified by a metric identifier that is stored in association with a label identifier that identifies a label, the label indicating a source of the data value. At 704, the method 700 may include providing the data value to a plurality of machine learning models trained to detect anomalies based on behaviors of historical data values of the metric.

At 706, the method 700 may include generating, based on execution of the plurality of models, a plurality of anomaly scores comprising at least a first anomaly score generated by a first model trained to detect anomalies based on a first behavior of the historical data values of the metric and at least a second anomaly score generated by a second model trained to detect anomalies based on a second behavior of the historical data values of the metric. Each anomaly score from among the plurality of anomaly scores represents a prediction that the data value is anomalous based on a respective machine learning model that models a corresponding behavior of the historical data values of the metric.

At 708, the method 700 may include generating an aggregate anomaly score based on the plurality of anomaly scores, the aggregate anomaly score representing an aggregate prediction that the data value is anomalous. At 710, the method 700 may include identifying a mitigative action to take based on the aggregate anomaly score.

Figure 8:
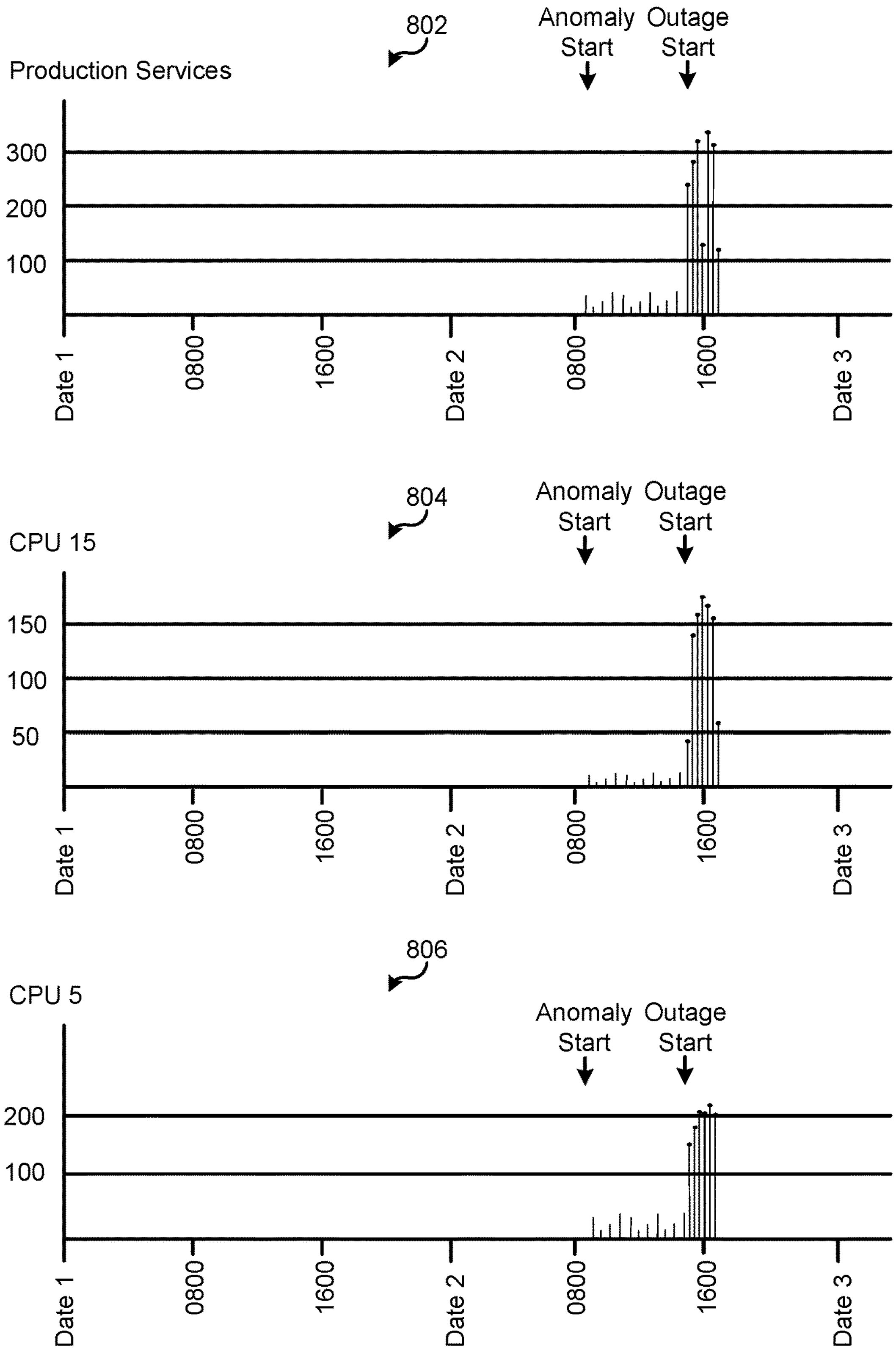
FIG. 8 shows illustrative graphs of case studies using anomaly detection in host monitoring data, according to an implementation.

FIG. 8 shows illustrative graphs 802, 804, and 806 of case studies using anomaly detection in host monitoring data, according to an implementation. Graph 802 shows anomaly detection in host "Production Services." Graph 804 shows anomaly detection in host "CPU 15." Graph 806 shows anomaly detection in host "CPU 5." In each of the graphs 802, 804, 806, time series of host activity data (an example of a metric 101) is plotted against time, which is indicated as "Date 1-3" and time increments. Not all data points are shown for illustrative clarity. Each line from the "anomaly start" to "outage start" indicates host activity that was detected as being anomalous prior to an outage of the host. The case studies back-tested actual data points leading up to real outages that occurred to determine whether early warning anomalies were detectable using the computer system 110.

As indicated on each of the graphs 802, on "Date 2," an outage occurred at approximately 1400. To test whether early warning anomalies were detectable, three metrics for each host was captured. In this example, the three metrics (examples of metrics 101-105) were: (1) number of processes running, (2) 5-minute CPU utilization and (3) 15-minute CPU utilization. These metrics were obtained at periodic intervals from various log sources.

The computer system 110 detected anomalous readings (indicated by "anomaly start") starting five hours prior to the outage (indicated by "outage start"). It should be noted that each point after the "anomaly start" that exhibited anomalous readings had their duration score incremented.

CPU_15 and CPU_5 both exhibited spikes that peaked at around 8:30. Using the pluggable architecture of ML models 120, the following scores were determined:

s(x)=1.0. The model 120A using seasonality and trend behavior indicated that the analyzed data value was out of the predicted range.

r(x)=1.0. the model 120B using rarest occurrence indicated that the analyzed data value was unlikely to have occurred in the historical data value.

c(x)=1.0. The multiple related metrics behavior indicated that the combination of the three metrics used was not expected.

d(x)=1.0. The duration score indicated that the issue persisted for more than an hour after the anomaly start. Thus, the total raw aggregate score was 4.0. The normalized aggregate score (accounting for in this example equal weighting) was 1.0. Using the mitigative actions illustrated in Table 3, this anomaly would have been flagged to be escalated, providing an early warning for mitigation to potentially prevent the outage.

FIG. 9A shows illustrative graphs 902 and 904 of case studies (testing) using anomaly detection in client network traffic data, according to an implementation. FIG. 9B shows illustrative graphs 906 and 908 of case studies (testing) using anomaly detection in client network traffic data, according to an implementation. In the examples shown, eleven metrics across all interfaces between a server system and client system was analyzed for a total of more than 120 data points. On "Date 7," there was a spike in network connections from the client system. The spike was within the capacity of the network, thus no alerts were generated by standard monitoring systems.

The computer system 110 detected the anomalous data points at around 11:00 and raised a 'warn' level alert for the sudden spike in traffic. The roughly fifty-fold spike in traffic is usually symptomatic of a potential Denial-of-Service (DoS) attack.

The anomaly scores were:

s(x)=1.0. The model 120A using seasonality and trend behavior indicated that the analyzed data value was out of the predicted range.

r(x)=0.84. the model 120B using rarest occurrence indicated that the analyzed data value was unlikely to have occurred in the historical data value.

c(x)=0.0. The multiple related metrics behavior indicated that the combination of the three metrics used was expected (not anomalous).

Thus, the total raw aggregate score was 2.32. The normalized aggregate score (accounting for in this example equal weighting) was 0.58. Using the mitigative actions illustrated in Table 3, this anomaly would have been flagged to be "warn", providing an early warning for mitigation to detect anomalous network traffic, including potential DoS attacks. The root cause was determined to be an application defect that caused the traffic spike, but the computer system 110 accurately warned of the anomaly.

It should be noted that the ML models 120A-N, while illustrated as being part of the pluggable architecture 115, is not necessarily limited to being pluggable. For example, in some implementations, some or all of the ML models 120A-N may not be pluggable. Instead, some or all of the ML models 120A-N may be set and not able to be added or removed by a user for the purpose of changing which models will be used for anomaly detection (other than by a system administrator or other user that configures the computer system 110 for anomaly detection).

Once trained, the ML models 120A-N may be stored in the ML models datastore 118. For example, the model parameters, model weights, and/or other data relating to the trained models 120A-N may be stored in the ML models datastore 118 along with model identifiers for each trained model. The metrics 101-105 and their associated labels may be stored in the labels and metrics datastore 116.

The datastores (such as 114, 116, 118) may be a database, which may include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The datastores may include cloud-based storage solutions. The database may store a plurality of types of data and/or files and associated data or file descriptions, administrative information, or any other data. The various datastores may store predefined and/or customized data described herein.

Each of the computer system 110 and client devices 160 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The computer system 110 and the one or more client devices 160 may be connected to one another via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more of the client devices 160. The data conveying the predictions may be a user interface generated for display at the one or more client devices 160, one or more messages transmitted to the one or more client devices 160, and/or other types of data for transmission. Although not shown, the one or more client devices 160 may each include one or more processors, such as processor 112.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in FIGS. 1, 2A, and 2B.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

a plurality of machine learning models comprising at least a first model trained via a first machine learning technique to detect one or more anomalies based on a first behavior of historical data values of a metric and a second model trained via a second machine learning technique to detect the one or more anomalies based on a second behavior of the historical data values of the metric, wherein the metric is identified by a metric identifier that is stored in association with a label identifier that identifies a label, the label indicating a source of the data value;

a processor programmed to:

access a data value of the metric for which an anomaly prediction is to be made;

provide the data value to the plurality of machine learning models;

generate, via the plurality of models, a plurality of anomaly scores comprising at least a first anomaly score generated by the first model based on the first behavior of the historical data values of the metric and at least a second anomaly score generated by the second model based on the second behavior of the historical data values of the metric, wherein each anomaly score from among the plurality of anomaly scores represents a prediction that the data value is anomalous based on a respective machine learning model that models a corresponding behavior of the historical data values of the metric;

generate an aggregate anomaly score based on the plurality of anomaly scores, the aggregate anomaly score representing an aggregate prediction that the data value is anomalous;

identify a mitigative action based on the aggregate anomaly score;

perform a lookup of a stored association of a metric identifier and label identifier pair based on the metric identifier to identify a source of the data value using the metric identifier and the label identifier; and generate for display an indication of the mitigative action and the identified source based on the stored association.

2. The system of claim 1, wherein the processor is further programmed to:

determine a duration of time that an anomaly relating to the metric has persisted based on a prior determination that a prior data value of the metric was anomalous; and generate a duration score based on the duration of time, wherein the aggregate anomaly score is positively correlated with the duration of time.

3. The system of claim 1, wherein the plurality of machine learning models are pluggable, and wherein the processor is further programmed to:

remove the second model from among the pluggable plurality of machine learning models; and add a third model to the pluggable plurality of machine learning models to generate an updated pluggable plurality of machine learning models, the third model being trained via a third machine learning technique to detect the one or more anomalies based on a third behavior of the historical data values.

4. The system of claim 3, wherein the processor is further programmed to:

access a second data value for which a second anomaly prediction is to be made;

provide the second data value to the updated pluggable plurality of machine learning models, the updated pluggable plurality of machine learning models now comprising at least the first model and the third model, but not the second model;

generate, via the updated pluggable plurality of models, an updated plurality of anomaly scores comprising at least a first updated anomaly score generated by the first model based on the first behavior and at least a third anomaly score generated by the third model based on the third behavior, wherein each updated anomaly score from among the updated plurality of anomaly scores represents a prediction that the second data value is anomalous based on a respective behavior of the historical data values; and generate a second aggregate anomaly score based on the updated plurality of anomaly scores, the second aggregate anomaly score representing an aggregate prediction that the second data value is anomalous.

5. The system of claim 1, wherein the first behavior comprises:

a seasonal and trend behavior for a time series of the historical data values, wherein the first anomaly score is based on a deviation of the data value from an upper and lower bound of the time series of the historical data values.

6. The system of claim 5, wherein the second behavior comprises:

a rarest occurrence behavior modeled via robust covariance of the historical data values, wherein the second anomaly score is based on a determination of whether the data value belongs to the distribution of the historical data values.

7. The system of claim 6, wherein the plurality of machine learning models comprises a third model that models a third behavior of the historical data values and generates a third anomaly score for the data value, the processor further programmed to:

identify at least one related metric that is related to the metric;

determine whether the data value is consistent with a combination of related historical data values of the at least one metric and the historical data values, wherein the third anomaly score is based on the determination of whether the data value is consistent with a combination of related historical data values of the at least one metric and the historical data values.

8. The system of claim 7, wherein the processor is further programmed to:

aggregate the first anomaly score, the second anomaly score, and the third anomaly score with a duration score to generate the aggregate anomaly score.

9. The system of claim 8, wherein to generate the aggregate score, the processor is further programmed to:

normalize each of the first anomaly score, the second anomaly score, the third anomaly score, and the duration score to a common scoring scale; and generate a sum of the normalized first anomaly score, the normalized second anomaly score, the normalized third anomaly score, and the normalized duration score.

10. The system of claim 1, wherein the mitigative action comprises an indication to investigate, warn, or escalate.

11. A non-transitory computer-readable storage medium storing instructions that, when executed by a processor, programs the processor to:

access a data value of a metric for which an anomaly prediction is to be made;

provide the data value to a plurality of machine learning models;

generate, via the plurality of models, a plurality of anomaly scores comprising at least a first anomaly score generated by the first model based on a first behavior of historical data values of the metric and at least a second anomaly score generated by the second model based on the second behavior of the historical data values of the metric, wherein each anomaly score from among the plurality of anomaly scores represents a prediction that the data value is anomalous based on a respective machine learning model that models a corresponding behavior of the historical data values of the metric; and generate an aggregate anomaly score based on the plurality of anomaly scores, the aggregate anomaly score representing an aggregate prediction that the data value is anomalous.

12. The non-transitory computer-readable medium of claim 11, wherein the instructions, when executed by the processor, further programs the processor to:

determine a duration of time that an anomaly relating to the metric has persisted based on a prior determination that a prior data value of the metric was anomalous; and generate a duration score based on the duration of time, wherein the aggregate anomaly score is positively correlated with the duration of time.

13. The non-transitory computer-readable medium of claim 11, wherein the metric is identified by a metric identifier that is stored in association with a label identifier that identifies a label, the label indicating a source of the data value, and wherein the instructions, when executed by the processor, further programs the processor to:

perform a lookup of a stored association of a metric identifier and label identifier pair based on the metric identifier; and identify a source of the data value based on the stored association.

14. The non-transitory computer-readable medium of claim 11, wherein the plurality of machine learning models are pluggable, and wherein the instructions, when executed by the processor, further programs the processor to:

remove the second model from among the pluggable plurality of machine learning models; and add a third model to the pluggable plurality of machine learning models to generate an updated pluggable plurality of machine learning models, the third model being trained via a third machine learning technique to detect anomalies based on a third behavior of the historical data values.

15. A method, comprising:

accessing, by a computer system, a data value of a metric for which an anomaly prediction is to be made, wherein the metric is identified by a metric identifier that is stored in association with a label identifier that identifies a label, the label indicating a source of the data value;

providing, by the computer system, the data value to a plurality of machine learning models trained to detect one or more anomalies based on behaviors of historical data values of the metric;

generating, by the computer system, based on execution of the plurality of models, a plurality of anomaly scores comprising at least a first anomaly score generated by a first model trained to detect the one or more anomalies based on a first behavior of the historical data values of the metric and at least a second anomaly score generated by a second model trained to detect the one or more anomalies based on a second behavior of the historical data values of the metric, wherein each anomaly score from among the plurality of anomaly scores represents a prediction that the data value is anomalous based on a respective machine learning model that models a corresponding behavior of the historical data values of the metric; and generating, by the computer system, an aggregate anomaly score based on the plurality of anomaly scores, the aggregate anomaly score representing an aggregate prediction that the data value is anomalous; and identifying, by the computer system, a mitigative action to take based on the aggregate anomaly score.

16. The method of claim 15, the method further comprising:

determining a duration of time that an anomaly relating to the metric has persisted based on a prior determination that a prior data value of the metric was anomalous; and generating a duration score based on the duration of time, wherein the aggregate anomaly score is positively correlated with the duration of time.

17. The method of claim 15, wherein the plurality of machine learning models is part of a pluggable architecture, the method further comprising:

removing the second model from among the plurality of machine learning models; and adding a third model to the plurality of machine learning models to generate an updated plurality of machine learning models, the third model being trained via a third machine learning technique to detect the one or more anomalies based on a third behavior of the historical data values.

18. The method of claim 17, the method further comprising:

accessing a second data value for which a second anomaly prediction is to be made;

providing the second data value to the updated plurality of machine learning models, the updated plurality of machine learning models now comprising at least the first model and the third model, but not the second model;

generating, via the updated plurality of machine learning models, an updated plurality of anomaly scores comprising at least a first updated anomaly score generated by the first model based on the first behavior and at least a third anomaly score generated by the third model based on the third behavior, wherein each updated anomaly score from among the updated plurality of anomaly scores represents a prediction that the second data value is anomalous based on a respective behavior of the historical data values; and generating a second aggregate anomaly score based on the updated plurality of anomaly scores, the second aggregate anomaly score representing an aggregate prediction that the second data value is anomalous.

19. The method of claim 15, the method further comprising:

receiving, via an input to a user interface, an indication that a third model is to be added to the plurality of machine learning models, wherein the third model is trained to learn a third behavior of the historical data values of the metric;

and adding the third model to the plurality of machine learning models, wherein the aggregate anomaly score is based on a third anomaly score output by the third model.

20. The system of claim 1, wherein the processor is further programmed to:

assign a respective weighting value to each anomaly score generated by the plurality of machine learning models, and to generate the aggregate anomaly score based on a weighted combination of the anomaly scores, wherein the weighting values are dynamically adjusted based on historical performance of the respective machine learning models.

* * * * *